(12) United States Patent
Wu et al.

(10) Patent No.: US 8,914,005 B2
(45) Date of Patent: *Dec. 16, 2014

(54) METHOD AND SYSTEM FOR NETWORK LOGOUT OF A MOBILE STATION IN IDLE MODE

(75) Inventors: Jianjun Wu, Shanghai (CN); Yong Xie, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,914

(22) Filed: Apr. 9, 2012

(65) Prior Publication Data

US 2012/0196638 A1 Aug. 2, 2012

Related U.S. Application Data

(63) Continuation of application No. 12/273,268, filed on Nov. 18, 2008, now Pat. No. 8,238,908, which is a continuation of application No. PCT/CN2007/070034, filed on May 18, 2007.

(30) Foreign Application Priority Data

Mar. 23, 2006 (CN) .......................... 2006 1 0071364
May 18, 2006 (CN) .......................... 2006 1 0082602

(51) Int. Cl.
*H04W 52/02* (2009.01)
*H04W 60/06* (2009.01)
*H04L 29/12* (2006.01)
*H04W 64/00* (2009.01)
*H04W 76/06* (2009.01)

(52) U.S. Cl.
CPC .......... *H04W 60/06* (2013.01); *H04L 29/12273* (2013.01); *H04L 61/2053* (2013.01); *H04W 64/00* (2013.01); *H04W 76/06* (2013.01)
USPC ........................................ 455/415; 455/435.1

(58) Field of Classification Search
USPC ........... 455/428, 458, 127.5, 343, 456.1, 574, 455/435.1, 11.1, 311, 412, 452.2; 370/311, 370/312
See application file for complete search history.

(56) References Cited

U.S. PATENT DOCUMENTS

| | | | |
|---|---|---|---|
| 5,857,144 | A | 1/1999 | Mangum et al. |
| 5,913,166 | A | 6/1999 | Buttitta et al. |

(Continued)

FOREIGN PATENT DOCUMENTS

| | | | |
|---|---|---|---|
| CN | 1423910 A | 6/2003 | |
| CN | 1549619 A | 11/2004 | |

(Continued)

OTHER PUBLICATIONS

International search report for International application No. PCT/CN2007/070034, dated Aug. 30, 2007, total 4 pages.

(Continued)

*Primary Examiner* — Khawar Iqbal
(74) *Attorney, Agent, or Firm* — Slater & Matsil, L.L.P.

(57) ABSTRACT

A method for a network side to logout a mobile station (MS) in an idle mode is provided. The method includes receiving, by a paging agent of network side entities, a location update request message carrying a power-off indication sent from the MS; sending, by the paging agent, a location update confirm message, to an anchor paging controller/location register of the network side entities. According to the location update confirm message, the anchor paging controller/location register triggers at least one network side entity of the network side entities to release resources associated with the MS and delete a context of the MS stored in the at least one network side entity. Accordingly, the system resources are saved.

13 Claims, 5 Drawing Sheets

(56) References Cited

U.S. PATENT DOCUMENTS

| | | | |
|---|---|---|---|
| 6,654,360 | B1 | 11/2003 | Abrol |
| 6,696,919 | B1* | 2/2004 | Leickel et al. ............... 340/5.74 |
| 2005/0007971 | A1 | 1/2005 | Jeong et al. |
| 2005/0055589 | A1* | 3/2005 | Kojo ............................ 713/300 |
| 2005/0192021 | A1 | 9/2005 | Lee et al. |
| 2006/0009242 | A1* | 1/2006 | Ryu et al. ..................... 455/458 |
| 2006/0025160 | A1* | 2/2006 | Kodali et al. ............. 455/456.5 |
| 2006/0109825 | A1 | 5/2006 | Abdel-Kader et al. |
| 2006/0178146 | A1* | 8/2006 | Lee et al. ................... 455/435.1 |
| 2006/0229022 | A1* | 10/2006 | Bu et al. ........................ 455/69 |
| 2007/0202871 | A1* | 8/2007 | Altshuller et al. ............ 455/428 |
| 2008/0063158 | A1 | 3/2008 | Gallant |
| 2009/0022080 | A1* | 1/2009 | Edlund et al. ................. 370/315 |
| 2011/0244864 | A1* | 10/2011 | Islam et al. ................... 455/436 |
| 2014/0087771 | A1* | 3/2014 | Ryu et al. ..................... 455/458 |

FOREIGN PATENT DOCUMENTS

| | | |
|---|---|---|
| CN | 1549640 A | 11/2004 |
| CN | 1567757 A | 1/2005 |
| EP | 1596616 A1 | 11/2005 |
| WO | 2004112328 A1 | 12/2004 |

OTHER PUBLICATIONS

English Translation of the Written Opinion of the International Search Authority for International application No. PCT/CN2007/070034, dated Aug. 30, 2007, total 5 pages.

European Search Report for European Patent Application No. 07721657.0,date Sep. 15, 2009,total 17 pages.

IEEE 802.16 Working Group,"IEEE 802.16e Air Interface for Fixed and Mobile Broadband Wireless Access System; Amendment 2 and Corrigendum 1";[Online];Feb. 28, 2006;IEEE;USA;XP002544146; ISBN:0-7381-4857-1;Retrieved from the Internet:URL:http://standards.ieee.org/getieee802/download/802.16e-2005.pdf>[retrieved on Sep. 2, 2009].total 68 pages.

Wimax Forum;"WiMAX End-to-End Network Systems Architecture—(Stage 2:Architecture Tenets,Reference Model and Reference points)—Dec. 15, 2005 Draft",Dec. 15, 2005;WiMAX Forum;XX,XX;pp. 1-242; XP002442962;total 242 pages.

Chinese office action for Chinese application No. 200610082602.1, dated Apr. 13, 2010,and an English translation thereof,total 7 pages.

US office action for U.S. Appl. No. 12/273,268, dated Oct. 14, 2011, total 18 pages.

WiMAX Forum Proprietary: WiMAX End-to-End Network Systems Architecture, Stage 3: Detailed Protocols and Procedures,© 2005, 2006 WiMAX Forum, dated Apr. 10, 2006,total 241 pages.

IEEE C802.16e-04/430r2: "IEEE 802.16 Broadband Wireless Access Working Group, Enhancements to the Message Transfers for the initialization of Scan, Sleep, and Idle Mode", dated Nov. 4, 2004,total 9 pages.

Corresponding granted Chinese Patent No. 101043741 B (Application No. 200610082602.1) citing prior art at Item (56), issued Feb. 2, 2011, 1 page only.

* cited by examiner

METHOD AND SYSTEM FOR NETWORK LOGOUT OF A MOBILE STATION IN IDLE MODE

CROSS-REFERENCE TO RELATED APPLICATIONS

This application is a continuation of U.S. patent application Ser. No. 12/273,268 filed on Nov. 18, 2008, which is a continuation of International Application No. PCT/CN2007/070034, filed on May 18, 2007. The International Application claims the priority of Chinese Application No. 200610082602.1, filed on May 18, 2006. All of the aforementioned patent applications are hereby incorporated by reference in their entirety.

FIELD OF THE INVENTION

The present disclosure relates to wireless access technology, more specifically to a method and a system for network logout of a mobile station in an idle mode.

BACKGROUND

This section provides background information related to the present disclosure. The descriptions herein are not necessarily prior art.

Idle mode is a work mode of a mobile station in a mobile broadband wireless access system as defined by IEEE 802.16e. In the idle mode, a mobile station (MS) may move in a wide area, receiving downlink broadcasting service information at regular intervals. A base station (BS) informs the MS of the delivery of the downstream service by broadcasting a message. The MS, when roaming within this area, does not have to register with the BS at the cell where the MS roams. In addition, the MS does not have to perform normal operations such as handoff when roaming into a different cell. Advantageously, the MS power and the resources of air interfaces may be saved.

A plurality of BS may constitute a group, called a Paging Group (PG). The goal of the paging group is to form a continuous area in which the MS does not need to send upstream service but may decide, through downstream paging channel, whether there is any downstream service sent to the MS. The paging group must be large enough to ensure that most mobile stations are retained in the same paging group within a relatively long time period. Moreover, the paging group must be small enough to ensure a reasonable overhead for paging MS in a paging group.

During normal operations with a certain serving BS, a MS may send a message requesting for entering the idle mode. Similarly, the serving BS may also send a message, actively requiring the MS to enter the idle mode. No matter it is the MS that actively requests to enter the idle mode, or it is the serving BS that actively requires the MS to enter the idle mode, MS has to complete registration and enter the idle mode in a prescribed time period.

The current World Interoperability for Microwave Access (WiMAX) under enactment defines a paging reference model in idle mode. In the paging reference model illustrated in FIG. 1, an Access Service Network Gateway (ASN_GW) does not take into consideration other physical net elements and logical entities in the WiMAX network which are irrelevant to a paging procedure. The WiMAX paging reference model is illustrated in FIG. 1 and explained in the subsequent detailed description.

According to the paging reference model in FIG. 1, when a MS actively sends a request to a BS1 (serving BS) for entering the idle mode, or the BS1 instructs the MS to enter the idle mode, the exchange of information between the MS and the BS1, between the BS1 and the back end net element, ASN_GW, may help to inform a paging controller (also known as an anchor paging controller, implemented in the ASN_GW) that the MS has entered the idle mode, and the paging controller may save the status information, paging information as well as service flow information of the MS in a corresponding location register (LR). The MS may carry information which the MS requests to preserve when it is entering the idle mode in the idle request message sent to the BS1. The BS1 may also configure similar information in a response to the idle request message so as to inform the MS of the related information preserved in the LR and inform the MS of the paging controller ID. Moreover, after the MS enters the idle mode, R4, R6 interfaces need to be released whereas the R3 interface between the home agent (HA) and foreign agent (FA) needs to be preserved.

Scenarios that the MS updates its location are described below.

(1) Paging Group update, referring to location update when the paging group changes. When the current paging group broadcast by the BS, received by the MS, is inconsistent with the paging group which was assigned to the MS, a location update needs to be performed and a new paging group as well as new paging parameters need to be assigned.

(2) Timer update, referring to location update in that the timer times out. After the MS enters the idle mode, both the network side and the MS will initiate a timer for idle mode management. The MS will perform a location update before the timer times out.

(3) Power off update, referring to location update when the MS powers off in the idle mode. In the idle mode, if the MS powers off, a location update may also need to be performed with the network side. In the prior art, the location update in the case of power off is just a normal location update, which does not delete the MS context preserved in the network entity.

(4) MAC Hash Skip Threshold update: a location update caused by exceeding a MAC Hash Skip Threshold.

The prior art simply describes the location update procedure in normal situations, or the location update procedure in the instance where the paging group changes. However, the prior art fails to consider the location update procedure in exceptional cases (e.g., network logout as a result of power off and congestion of the network, etc.). The solution to handle the location update procedure in the exceptional cases may differ from what is in the prior art discussed above.

SUMMARY OF THE INVENTION

This section provides a general summary of the invention, and is not a comprehensive disclosure of its full scope or all of its features.

In view of the foregoing issues, various embodiments provide a method for network logout of an MS in an idle mode, so as to offer a solution to network logout in various situations for the MS in the idle mode.

The method for a network side to logout a mobile station in an idle mode, wherein the network side comprising a plurality of network entities, includes the following:

receiving, by a paging agent of the network entities, a location update request message carrying a power-off indication from the mobile station;

verifying, by the paging agent, the location update request message according to an authentication key and an authentication key context of the mobile station; and after successfully verifying the location update request message, sending, by the paging agent, a location update confirm message, to an anchor paging controller/location register of the plurality of network entities;

According to the location update confirm message, the anchor paging controller/location register triggers at least one network entity of the plurality of network entities to release resources associated with the mobile station and delete a context of the mobile station stored in the at least one network entity.

The embodiments further propose a system for a network side to logout a mobile station in an idle mode. The system includes a plurality of network entities serving the mobile station, where the plurality of network entities includes a paging agent and an anchor paging controller/location register.

The paging agent is configured to receive a location update request message carrying a power-off indication from the mobile station, verify the location update request message according to an authentication key and an authentication key context of the mobile station and send a location update confirm message to the anchor paging controller/location register after successfully verifying the request message.

The anchor paging controller/location register is configured to trigger, according to the location update confirm message, at least one network entity of the plurality of network entities to release resources associated with the mobile station and delete a context of the mobile station stored in the at least one network entity.

The embodiments further propose a method for a network side to logout a mobile station in an idle mode, wherein the network includes a plurality of network entities, and the method includes:

determining, by the mobile station, if one or more conditions for entering the idle mode are met and trigging an operation to enter the idle mode if the one or more conditions are met; and sending, by the mobile station, a location update request message carrying a power-off indication to a paging agent of the plurality of network entities;

The request message is verified by the paging agent according to an authentication key and an authentication key context of the mobile station. The verified request message triggers the paging agent to send a location update confirm message, to an anchor paging controller/location register of the plurality of network entities.

According to the location update confirm message, the anchor paging controller/location register triggers at least one network entity of the plurality of network entities to release resources associated with the mobile station and delete a context of the mobile station stored in the at least one network entity.

The embodiments further propose a mobile station in communication with a network. The network includes a plurality of network entities. The mobile station includes:

a processor, configured to determine if one or more conditions for entering the idle mode are met and trigging an operation to enter the idle mode if the one or more conditions are met; and a transmitter, configured to send a location update request message carrying a power-off indication to a paging agent of the plurality of network entities;

the request message is verified by the paging agent according to an authentication key and an authentication key context of the mobile station;

the verified request message triggers the paging agent to send a location update confirm message, to an anchor paging controller/location register of the plurality of network entities.

According to the location update confirm message, the anchor paging controller/location register triggers at least one network entity of the plurality of network entities to release resources associated with the mobile station and delete a context of the mobile station stored in the at least one network entity.

Advantageously, methods for network logout for the MS in idle mode according to the present disclosure provide location update procedures in various situations and enable the paging controller or other network entity to delete the context of the MS after location update is done, and timely release the resources that the network side uses to configure the MS. Accordingly, the system resources are saved.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only. They merely represent a few selected embodiments and not all possible implementations are presented, and they are not intended to limit the scope of the present disclosure.

Corresponding reference numerals indicate corresponding parts throughout the several views of the drawings.

DETAILED DESCRIPTION

Figure 1:
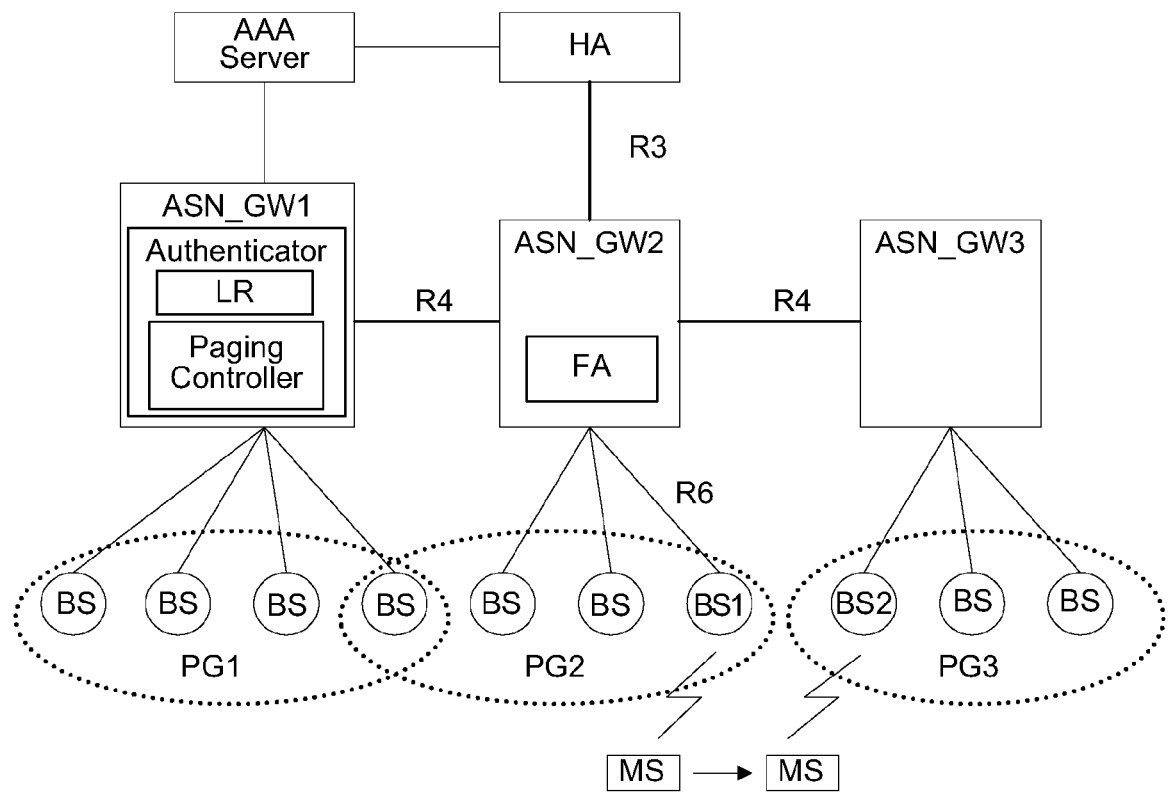
FIG. 1 is a prior art paging reference model for the existing WiMAX system.

Exemplary embodiments of the present invention will now be described more fully with reference to the accompanying drawings.

Reference throughout this section to "one embodiment," "an embodiment," "specific embodiment," or the like in the singular or plural form means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural form in various places throughout this specification are not necessarily all referring to the same embodiment. Furthermore, the particular features, structures, or characteristics may be combined in any suitable manner in one or more embodiments.

To present the goal, technical solutions and advantages concerning the embodiments more clearly, detailed description is made below to the embodiments in conjunction with the accompanying drawings.

Embodiments provide methods for network logout in various situations for an MS in the idle mode so that the resources used by a network side to configure the MS are timely released. The various situations include, but not limited to, MS power-off, location update timeout, resource congestion of the network side or variation of the network side based on service policy.

A paging controller (PC) is a network entity controlling the MS activity in the idle mode. This entity is a logical entity in the current WiMAX network architecture and is closely related to another logical entity, authenticator (the paging controller might serve as a part of logical functions in the authenticator and be implemented in the same physical network element as the authenticator). The physical location of the paging controller might be in a physical network element, Access Service Network Gateway (ASN_GW), in the WiMAX network, and might also be in another separate physical network element. For ease of description, the paging controller (PC), i.e., the logical entity, or the Access Service Network Gateway (ASN_GW), i.e., the physical entity where the paging controller might be located, will be abbreviated as PC/ASN_GW.

Moreover, since the paging controller needs to initiate a paging message according to the paging group where the current MS is located, there is a need for a location register (LR) to save the status information, paging information and service flow related information of the MS. In general, a PC logical entity may correspond to an LR logical entity. These two logical entities may be implemented in a same physical network element. These two logical entities which correspond to each other may be abbreviated as PC/LR.

A paging agent is a logical entity which may be located in a physical network element, e.g., a serving base station, or may be located in a separate physical network element. For ease of description, the paging agent or the serving base station where the paging agent is located may be abbreviated as paging agent/serving base station.

For example, when the mobile station powers off, a network logout in the idle mode may be implemented according to the procedure presented in the present disclosure.

a. The MS sends to the paging agent or the serving base station where the paging agent is located (hereinafter paging agent/serving base station) a search request message with a power-off indication so as to initiate a location update;

b. The paging agent/serving base station verifies the search request message according to an authentication key (AK) and AK context of the MS (one of contexts of the MS). Two situations may occur. One is that the paging agent/serving base station has saved a valid AK and AK context of the MS. The other one is that the paging agent/serving base station has not saved a valid authentication key (AK) and AK context of the MS. If the AK and AK context of the MS have not been saved, key information must be obtained to verify the validity of the search request message.

c. If the search request message is valid, the paging agent/serving base station performs the location update and transmits a location update confirmation message to an anchor paging controller/location register.

d. If the location update is confirmed successfully, the anchor paging controller/location register deletes the context of the MS.

Detailed illustrations of a plurality of embodiments of the invention are made to the schemes for MS logout in various situations.

Embodiment One

Figure 2:
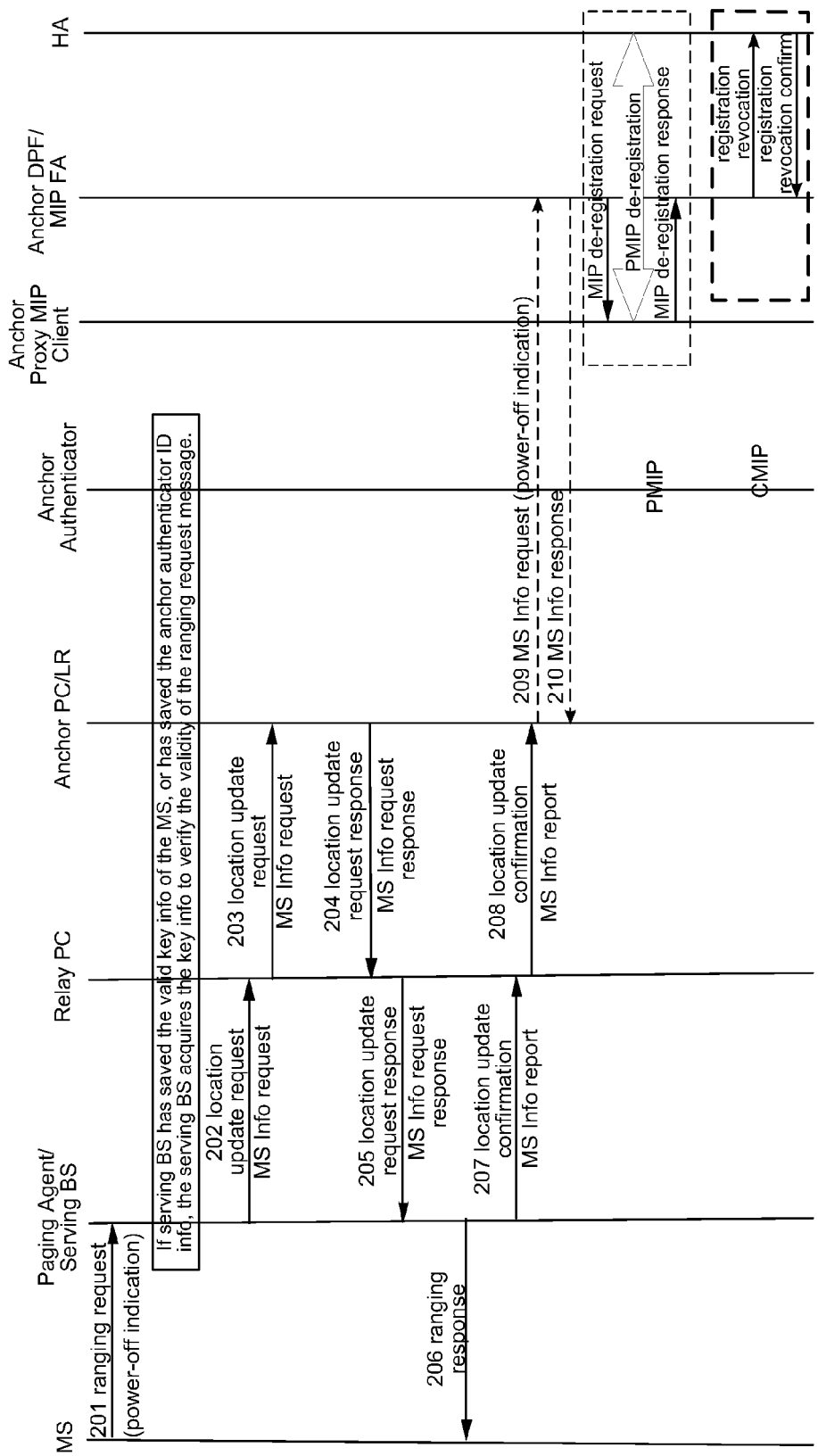
FIG. 2 is flowchart of a MS logout procedure according to a first embodiment of the invention.

FIG. 2 is a flowchart of a MS logout procedure according to the first embodiment of the invention. If the paging agent/serving base station has saved the valid authentication key (AK) and AK context of the MS, the process of network logout according to the present disclosure are presented as follows.

At 201, the MS initiates a location update via a search request message (such as a ranging request (RNG_REQ) message) which carries a MS ID, an anchor paging controller ID and a power-off indication. The power-off indication indicates that the current MS is in the idle mode and attempts to power off.

At 202, after receiving the search request message (such as the RNG_REQ) from the MS, the paging agent/serving base station verifies the validity of the search request message (such as the RNG_REQ) according to valid authorization keys (AK) and AK contexts it saved.

I. If the RNG_REQ is invalid, the paging agent/serving base station sends a ranging response (RNG_RSP) message carries indication of unsecured location update, indicating a location update failure. The RNG_RSP message directs the MS to conduct a re-access procedure, terminates the location update procedure and retains the information relating to the MS saved by all the entities at the network side.

II. If the RNG_REQ is valid, the paging agent/serving base station sends a location update request (LU_REQ) message to the Serving Access Service Network Gateway (Serving ASN_GW) which then forwards the location update request message to a relay paging controller (relay PC) (may also be located in the ASN_GW). The location update request message may carry a MS ID, a BS ID, an anchor paging controller ID and a power-off indication as well as an indication of verification completion.

At 203, the relay paging controller may forward the location update request message to the anchor paging controller (which may be located in an ASN_GW that is same or different from the one where the relay paging controller is located) and may add a cell carrying relay paging controller indicator in the forwarded location update request message.

At 204, after receiving the location update request message, the anchor paging controller performs a location update and logs the ID information of the relay paging controller where the MS is located and makes a reply of a location update response (LU_RSP) message to the ASN_GW where the relay paging controller is located. Since the location update request message indicates the completion of the verification, the LU_RSP message may just carry the MS ID and a Transaction ID.

At 205, the relay paging controller forwards the LU_RSP message to the paging agent/serving base station.

At 206, after receiving the LU_RSP, the paging agent/serving base station makes a reply of a ranging response (RNG_RSP) message to the MS, indicating the successfulness of the location update.

At 207, the paging agent/serving base station makes a reply of a location update confirmation (LU_Confirm) message to the relay paging controller. The message carries an indication of the success or failure of the location update.

At 208, after receiving the location update confirmation (LU_Confirm) message, the relay paging controller further makes a reply of the LU_Confirm message to the anchor paging controller. The message contains a power-off indication.

After the anchor paging controller receives the LU_Confirm message forwarded from the relay paging controller, and if the location update is confirmed as successful and the LU_Confirm message contains the power-off indication, the anchor paging controller, including its associated location register, may delete the context of the MS it preserved and all parameters preserved for the MS in the idle mode. If the location update fails, the context of the MS will not be deleted.

According to one embodiment, 203-206 are optional, which means that after the verification of the search request message, the paging agent may send an update confirmation request (or a MS information request) directly to the anchor paging controller via the relay paging controller so that the anchor paging controller may perform the location update and delete the context of the MS.

After 208, the process according to the embodiment may further include the following.

At 209, the anchor paging controller sends the MS information request (MS Info Request) message to an Anchor Data Path Function entity or a Foreign Agent (anchor data path function/FA). The MS information request message carries a power-off indication.

At 210, after receiving the MS Info Request message, the anchor data path function (DPF)/FA will delete the maintained context of the MS and, at the meantime, make a reply (MS Info Response) message to the anchor paging controller, indicating a successful deletion of the context of the MS.

The process according to the embodiment may further include the following.

The FA, at the same time, sends a Delete MS Context Indication message carrying the MS ID and informs an anchor service flow authorization (anchor SFA) function entity and an anchor authenticator to which the MS corresponds. The anchor SFA and the anchor authenticator respond to this message and delete all the context corresponding to the MS.

Further, the anchor authenticator may also inform an anchor accounting client of the MS to stop accounting for the MS and inform the Authentication Authorization Accounting server (AAA) server to acquire information regarding the network logout of the MS. The AAA server performs a network logout upon the MS and deletes context associated with the MS.

The process according to the embodiment further includes the following.

For a proxy mobile IP (PMIP) MS, the FA (the mobile IP foreign agent at this point), at the same time, informs the Anchor PMIP Client to initiate a de-registration procedure for the mobile IP (MIP).

For client mobile IP (CMIP), since the MIP client is on the MS and there is no data path which may carry MIP registration signaling between the MS and FA at the present, the FA may send a Registration Revocation message to the HA to perform the MIP de-registration procedure. Meanwhile, the HA responds to the Registration Revocation message to the FA to complete the de-registration procedure for the MIP.

The de-registration procedure for PMIP may also be similar to that for CMIP.

Alternatively, the anchor paging controller/location register may inform an anchor service flow authorizer, an anchor authenticator and an anchor proxy mobile IP client to delete the context of the MS.

The MS anchor flow authorizer may further inform a policy server of the MS logout in a notification message and the notification message may carry a MS ID, a logout indicator, logout reasons or any combination thereof.

The policy server deletes the context of the MS that it maintains according to the received notification message, and may log the logout reasons at the same time.

If the AAA server has preserved the AK context of the MS, the anchor authenticator may further inform the AAA server of the MS logout in a notification message and the notification message may carry the MS ID, the logout indicator, the logout reasons or any combination thereof.

The AAA server deletes the context of the MS that it maintains according to the received notification message, and may log the reasons for the network logout at the same time.

The embodiment may further include requesting an IP address allocation entity to release the IP address of the MS.

Since there are various approaches for allocating the IP addresses, different allocation approaches may have different procedures for releasing the IP address. Therefore, in the process of network logout of the MS, the procedure for releasing the IP address to be performed may vary with the allocation approach as well.

For instance, for the dynamically allocated IP address, the FA may inform a dynamic host configuration protocol (DHCP) proxy to initiate a process for releasing the IP address. The DHCP proxy sends a DHCP Release Request message to the DHCP server. Alternatively, the anchor paging controller/location register may inform the DHCP proxy to send the DHCP Release Request to the DHCP server so as to release the dynamic IP address.

With respect to the approach of assigning the IP address in the authentication procedure, IP addresses may be released during the exchange between the anchor authenticator and the AAA server that occurs when the MS is logging out of the network; alternatively, with respect to the approach of acquiring IP addresses during a MIP registration procedure, the IP addresses may be released during a de-registration procedure for the MIP when the MS is logging out of the network.

The foregoing completes the logout process for the MS in the idle mode.

Embodiment Two

Figure 3:
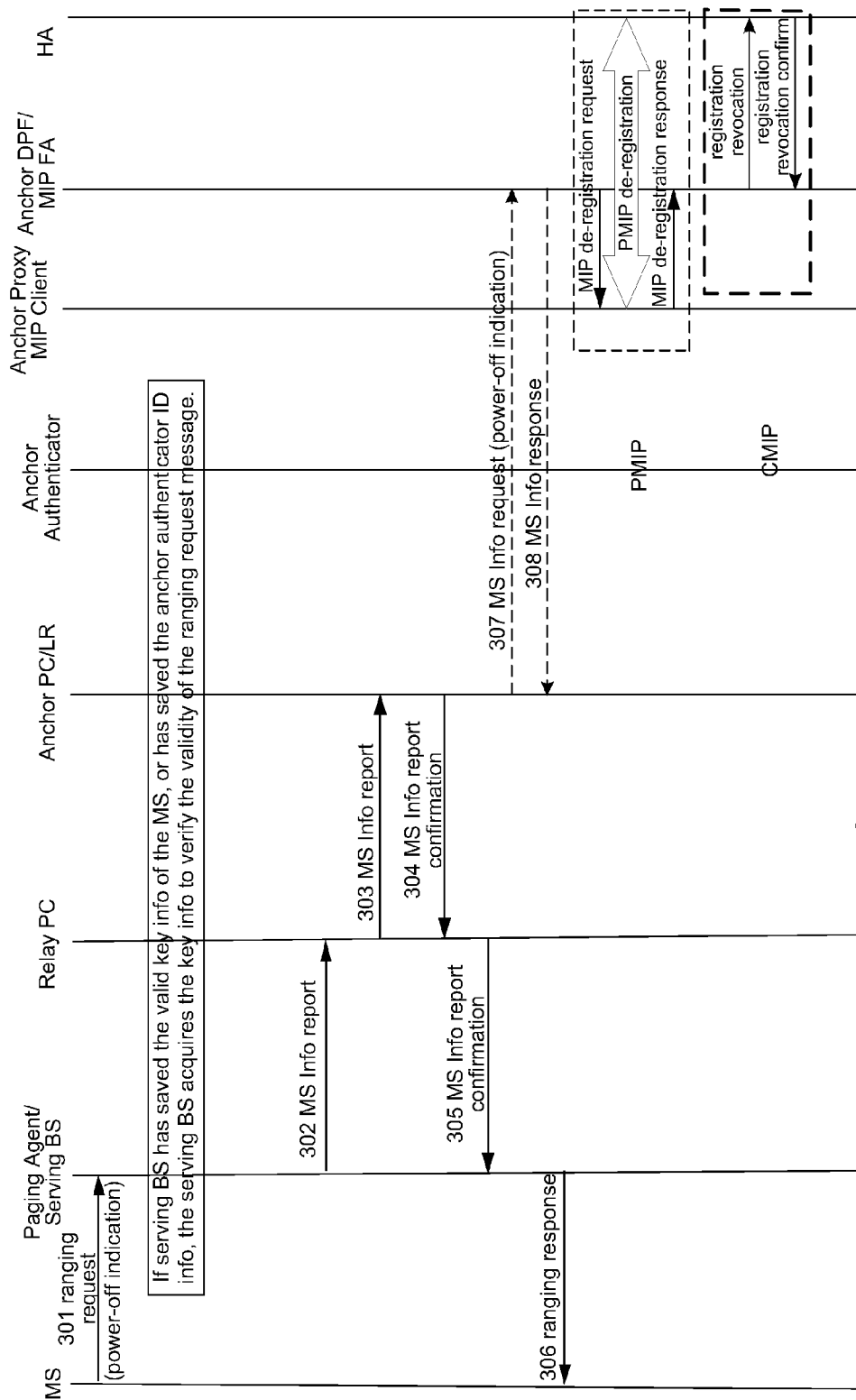
FIG. 3 is flowchart of a MS logout procedure according to a second embodiment of the invention.

FIG. 3 illustrates a flowchart of a network logout procedure according to this embodiment. After the paging agent/serving base station completes the verification of the search request message, 302 and 303, it may transmit an MS information report to the anchor paging controller/location register directly or via the relay paging controller. The anchor paging controller/location register directly performs a location update, deletes the context of the MS and transmits, at the same time, to the MS an information report confirmation to the paging agent via 304 and 305. At 306, the paging agent/serving base station returns a search response to the MS. 307 and its subsequent procedures are similar to 209 and its subsequent procedures, which is omitted herein for clarity.

Embodiment Three

Figure 4:
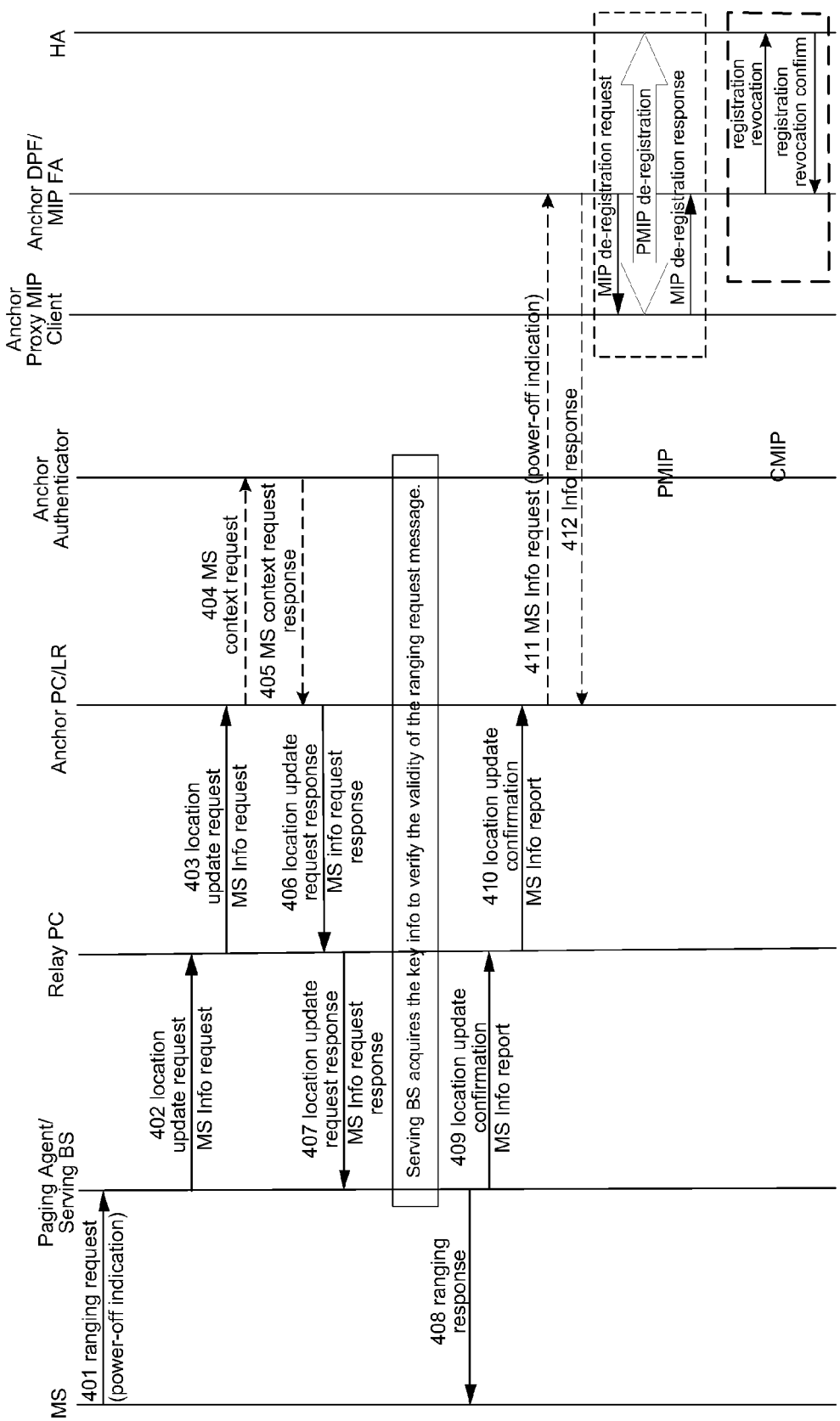
FIG. 4 is flowchart of a MS logout procedure according to a third embodiment of the invention.

According to this embodiment, the paging agent/serving base station has not saved the valid authentication key (AK) and AK context of the MS. As illustrated in FIG. 4, the network logout method according to the embodiment includes the following procedures.

At 401, the MS initiates a location update via a search request (such as a RNG_REQ) message which carries a MS ID, an Anchor Paging Controller ID and a power-off indication. The power-off indication indicates that the MS in current idle mode attempts to power off.

At 402, after the paging agent/serving base station receives the search request message (such as RNG_REQ) from the MS, it is necessary to acquire authentication key information to verify the validity of the RNG_REQ message since the paging agent/serving base station has not saved the valid authentication key (AK) and AK context of the MS. If the paging agent/serving base station does not know the Anchor Authenticator ID information of the MS, the paging agent/serving base station sends a location update request (LU_REQ) message to the serving ASN_GW which then forwards the LU_REQ message to an ASN_GW where the relay paging controller is located. The message may carry an MS ID, a BS ID, an anchor paging controller ID, a power-off indication and an indication of a need for MS security information.

At 403, the relay paging controller forwards the RNG_REQ to the ASN_GW where the anchor paging controller is located and adds a cell carrying relay paging controller ID in the forwarded message.

After receiving the RNG_REQ, the anchor paging controller logs the ID information of the relay paging controller where the MS is located, and performs a location update. If the RNG_REQ indicates the need for security information, the anchor paging controller will find the anchor authenticator ID information of the MS in the anchor location register associated with the anchor paging controller.

At 406, the anchor paging controller may make a reply of a location update response (LU_RSP) message to the relay paging controller. The message may carry the MS ID, the anchor paging controller ID, the relay paging controller ID, the BS ID and anchor authenticator ID information.

At 407, the relay paging controller forwards the LU_RSP message to the paging agent/serving base station.

After the paging agent/serving base station receives the LU_RSP message, and if the LU_RSP message carries the anchor authenticator ID information, the serving BS may send a key request (AK_Request) message to the ASN_GW where the anchor authenticator is located, requesting to generate the AK and AK context. The anchor authenticator returns the AK and AK context to the paging agent/serving base station via a key transfer (AK_Transfer) message. The paging agent/serving base station verifies the RNG_REQ message after receiving the AK and AK context.

At 408, if the verification is successful, a search response (RNG_RSP) message is replied to the MS, indicating the success of the location update. If the verification fails, a failure indicator will be contained in the RNG_RSP message and the MS will be directed to perform a network re-access procedure, where the procedure of directing the MS to re-access the network is optional.

After 403 of the embodiment, 404 and 405 may also be performed, as illustrated in FIG. 4. That is, the anchor paging controller directly informs the anchor authenticator to generate a new AK and AK context for the MS. Then, at 406, the LU_RSP message replied to the relay paging controller by the anchor paging controller may directly carry the generated AK and AK context, rather than carry the authenticator ID information.

At 409, the paging agent/serving base station makes a reply of the location update confirmation (LU_Confirm) message to the relay paging controller. The update confirmation message carries an indication of success or failure of the location update.

At 410, after receiving the LU_Confirm message, the relay paging controller further responds to the LU_Confirm message to the anchor paging controller. The message contains a power-off indication.

411 and its subsequent procedures of this embodiment are similar to 209 and its subsequent procedures of the first embodiment, which is omitted herein for clarity.

In the step 402 of this embodiment, if the paging agent/serving base station stores the anchor authenticator ID information, the paging agent/serving base station may send a key request (AK_Request) message directly to the ASN_GW where the anchor authenticator is located, requesting the AK and AK context of the MS. The message carries the MS ID and the BS ID. After receiving the message, the anchor authenticator generates a new AK and AK context for the MS and sends the AK and AK context to the paging agent/serving base station via a key transfer (AK_Transfer) message. After verification, the paging agent/serving base station sends the location update request (LU_REQ) message to the relay paging controller. The LU_REQ message carries the MS ID, the BS ID, the anchor paging controller ID and the indication of the completion of verification. Then, the relay paging controller forwards the location update request message to the anchor paging controller/location register. The anchor paging controller/location register logs the ID information of the relay paging controller where the MS is located, performs the location update and deletes the context of the MS. The subsequent procedures are similar to step 304 and its subsequent procedures of the second embodiment, which is omitted herein for clarity.

Embodiment Four

This embodiment provides a network logout procedure initiated by the network side caused by the time-out of the location update. In the MS idle mode, the anchor paging controller/location register may wait for a periodic location update of the MS. When the anchor paging controller/location register does not receive the location update request of the MS within a predetermined time period, the MS is deemed to be off the network and a network logout operation needs to be performed upon the MS. The process is as follows.

(1) The anchor paging controller/location register waits for the location update of the MS until a timer times out. The anchor paging controller, including its associated location register, may delete the context of the MS it preserved and all parameters preserved for the MS in idle mode.

(2) The anchor paging controller transmits the MS Information Request (MS Info Request) message to the anchor data path function entity/FA. The MS Info Request message carries indication of MS logout. After receiving this message, the anchor data path function entity/FA will delete all the preserved context of the MS and, at the meantime, make a reply of the MS Information Response (MS Info Response) message to the anchor paging controller, indicating a deletion success.

(3) The anchor data path function entity/FA sends a Delete MS Context Indication message carrying the MS ID and informs the anchor service flow authorization (anchor SFA) function entity and anchor authenticator to which the MS corresponds. The anchor SFA and the anchor authenticator delete the context associated with the MS.

Further, the anchor authenticator may also inform the anchor accounting client of the MS to stop accounting for the MS and inform the AAA server of the MS logout information. The AAA server performs the network logout upon the MS and deletes the context associated with the MS.

The anchor flow authorizer of the MS may further inform a policy server of the MS logout in a notification message and the notification message may carry information such as the MS ID, the logout indicator, and/or logout reasons.

The policy server deletes the context of the MS it maintains according to the received notification message, and may, at the same time, log the reasons for network logout.

If the AAA server preserves the AK context of the MS, the MS anchor authenticator may further inform the AAA server of the MS logout and may carry one of a MS ID, a logout indicator, the reasons for logout or any combination thereof.

The AAA server deletes the context of the MS it maintains according to the received notification message, and may, at the same time, log the reasons for network logout.

(4) For a MS with a proxy mobile IP (PMIP) address, the FA further informs an Anchor PMIP Client to initiate a de-registration procedure for the mobile IP (MIP) address.

For a MS with a client mobile IP (CMIP) address, since the client of the MIP is on the MS and there is no data path which may carry MIP address registration signaling between the MS and FA at present, the FA may send a Registration Revocation message to the HA to perform the MIP address de-registration procedure. Meanwhile, the HA responds to the Registration Revocation message to the FA to complete the MIP address de-registration procedure.

The de-registration procedure for the PMIP address may also be similar to that for the CMIP address.

(5) IP address allocation entity releases the IP address of the MS.

For a dynamically allocated IP address, FA may, at the same time, inform the dynamic host configuration protocol (DHCP) proxy to initiate a procedure for releasing the IP address. The DHCP proxy sends a DHCP Release Request message to the DHCP server for releasing the dynamic IP address.

With respect to the approach of assigning the IP address in the authentication procedure, the IP addresses may be released during the exchanges between the anchor authenticator and the AAA server when the MS is logging out of the network; alternatively, with respect to the approach of acquiring the IP addresses during the MIP registration procedure, the IP addresses may be released during the MIP de-registration procedure when the MS is logging out of the network.

So far, the network logout procedure is done. Since the network logout is caused by the fact that the network has not received the location update message of the MS, the network regards the MS as being off the network. Therefore, the network would not inform (also not be able to inform) the MS of performing the logout operation.

Embodiment Five

This embodiment provides a network logout procedure for MS in the idle mode as a result of resource congestion at the network side or a service policy change, etc.

The resource congestion at the network side may occur in a physical entity where the foreign agent is located or in a physical entity where the service flow authorization management entity (anchor SFA) is located or a physical entity where the home agent is located.

Since the MS, when in the idle mode, may occupy some resources, such as a link of R3 interface, an IP address, and resources of the FA. When these resources are in congestion (i.e. short of resources), the network side would consider to release the resources occupied by the MS that are inactive for a long time or that are of low priority, so that the resources can be used by those mobile devices who need them. Meanwhile, the network side would initiate an MS logout procedure and inform the MS that the network is not available temporarily.

Specifically, the procedure is as follows.

(1) A congested function entity (such as FA, DHCP, anchor data path to which the MS corresponds) sends an MS Info REQ message which carries information such as the MS ID, an indication requiring the MS to logout the network and reasons for logout. (If the DHCP, anchor data path function entity does not know the anchor paging controller/location register to which the MS corresponds, the congested function entity may send a message to the FA which will forward the message.)

(2) After receiving this message, the anchor paging controller/location register initiates a paging to the MS with a normal paging procedure. A paging message carries the purpose of requiring the MS to log out the network and may contain below information: a time indicator or a time and range indicator, requiring the MS not to access the current network in a prescribed time period, or not to access the network in a prescribed range and in a prescribed time period. Such range may include the current base station, or the current paging group or other ranges. Alternatively, the MS may be instructed to connect to other networks which can be a WiMAX network or other types of network. In addition, the anchor paging controller, including its associated location register, may delete the context of the MS it preserved and all parameters preserved for the MS in the idle mode. Since the MS may not be responsive to the paging message of such reason, the BS, the relay paging controller, the anchor paging controller may not perform other processing (e.g., do not start timer or feedback the success or failure of the paging) after transmitting multiple paging broadcasting messages at air interfaces.

(3) The anchor paging controller sends the MS Information Request (MS Info Request) message to the anchor data path function entity and foreign agent (FA). The MS Info Request message carries an indication of MS logout. After receiving this message, the anchor data path function entity and FA will delete all the maintained context of the MS and, at the meantime, makes a reply of the MS Information Response (MS Info Response) message to the anchor paging controller, indicating the completion of the deletion.

(4) At the same time, the FA transmits a Delete MS Context Indication message carrying the MS ID and informs the anchor service flow authorization (Anchor SFA) function entity and anchor authenticator to which the MS corresponds. The Anchor SFA and the anchor authenticator delete the context associated with the MS.

(5) Further, the anchor authenticator may also inform the anchor accounting client of the MS to stop accounting for the MS and inform the AAA server to acquire the information of the MS logout. The AAA server performs the network logout upon the MS and deletes the MS related context.

(6) For a MS with a proxy mobile IP (PMIP) address, the FA may, at the same time, inform the Anchor PMIP Client to initiate a MIP address de-registration procedure. For a MS with a client mobile IP (CMIP) address, since the client of the MIP address is on the MS and there is no data path which may carry MIP address registration signaling between the MS and FA at present, the FA may transmit a Registration Revocation message to the HA for performing MIP address de-registration procedure. Meanwhile, the HA responds to the Registration Revocation message to the FA to complete the MIP address de-registration procedure.

The de-registration procedure for the PMIP may also be similar to that for CMIP.

For a dynamically allocated IP address, the FA may, at the same time, informs a dynamic host configuration protocol (DHCP) proxy to initiate a procedure for releasing the IP address. The DHCP proxy sends a DHCP Release Request message to the DHCP server. Alternatively, the anchor paging controller/location register may inform the DHCP proxy to transmit the DHCP Release Request to the DHCP server. Since there are various approaches for allocating the IP addresses, different allocation approaches differs in releasing the IP address. Therefore, in the process of MS logout, the procedure to be performed for releasing IP address may also vary with the allocation approach. For instance, with respect to the approach of assigning IP address in the authentication procedure, IP addresses may be released during the exchanges between the authenticator and the AAA server when the MS is logging out the network; alternatively, with respect to the approach of acquiring IP addresses during MIP registration procedure, the IP addresses may be released during MIP de-registration procedure when the MS is logging out the network.

(7) After the MS receives the paging message, it does not make any response, and directly performs the logout operation and deletes information associated with the session and transaction flow. If the paging message carries a time indicator or a time and range indicator, the MS may not be allowed to access the current network in a prescribed time period or not to access the network in a prescribed range and in a prescribed time period. If the message carries an indicator that instructs the MS to access other networks, the MS may initiate an attempt to access the indicated networks according to the capability of its own. After the MS completes the logout procedure, the MS may not initiate operations such as location update and paging message listening, but may receive network information and re-access the network once conditions are met. After the MS completes the logout operation, it may attempt to access into other WiMAX networks or non-WiMAX networks to obtain services on its own initiative according to the capability of its own.

The changes of the network side may be caused by the operator's policy configuration which the AAA server is based on. The policy configuration includes performing a logout operation when a subscriber owes the service charge, or the user of the MS requests to stop receiving all the services on his initiative (specifically, for example, the MS may annul the user's license due to loss of the device) or the operator requires the MS to log out of the network.

When the network side varies with the service policy, the AAA server may initiate a logout request by carrying the indication of MS logout in the accounting message transmitted to the Anchor Accounting Client of the MS. The accounting message may further carry information such as the MS ID and/or logout reasons. After the Anchor Accounting Client of the MS receives the message, it informs the anchor paging controller of the MS. Subsequent procedures, e.g., process (2) above and its subsequent processes of the embodiment, are executed by the anchor paging controller.

Considering another scenario, the AAA server may also initiate a logout request by carrying the indication of MS logout in the authentication message transmitted to the anchor authenticator of the MS. The authentication message may also carry information such as the MS ID and/or logout reasons. After the Anchor Accounting Client of the MS receives the message, it informs the anchor paging controller of the MS. Subsequent procedures, e.g., process (2) and its subsequent processes of this embodiment, are executed by the anchor paging controller. In addition, in the logout procedure, a compulsory logout procedure may be conducted without informing the MS.

Embodiment Six

Figure 5:
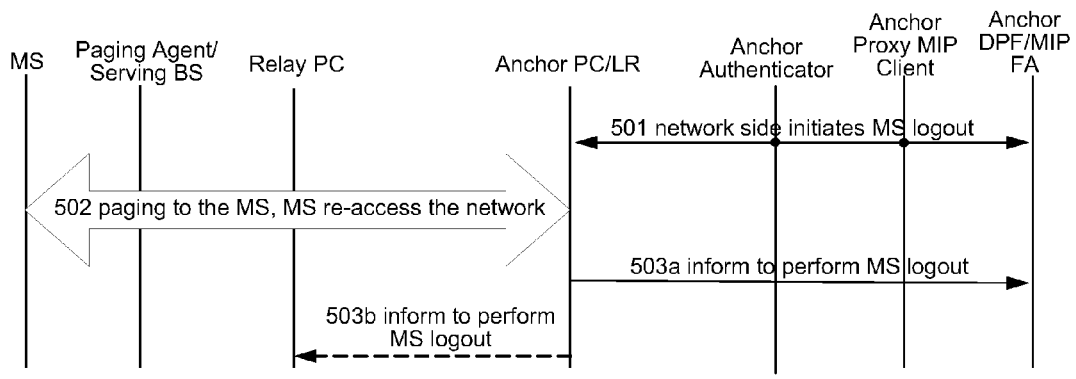
FIG. 5 is flowchart of a MS logout procedure according to a sixth embodiment of the invention.

The network side initiates an MS logout procedure. The anchor paging controller/location register initiates a paging procedure to the MS. The MS enters an active mode from the idle mode. The network may then perform the MS logout by employing a logout method with regard to the active mode. As illustrated in FIG. 5, the process includes following processes.

At 501, the network side entity triggers a logout operation and informs the anchor paging controller/location register to perform the logout operation upon the MS in the idle mode.

At 502, the anchor paging controller/location register initiates a paging procedure to the MS, requiring the MS to re-connect to the network. The MS responds to the paging message and initiates the re-access operation to enter into the active mode.

At 503, after the anchor paging controller/location register are informed that the MS has entered the active mode, it initiates an MS logout procedure. The anchor paging controller/location register herein may have one of the following options.

Process 503a: the anchor paging controller/location register sends a message to the anchor data path entity/FA to inform the anchor data path entity/FA to perform the logout operation upon the MS.

Process 503b: the anchor paging controller/location register sends a message to the ASN_GW of the MS, informing the ASN_GW to perform the logout operation upon the MS. If the anchor paging controller/location register and the ASN_GW are located on the same physical entity, the anchor paging controller/location register directly sends the message to the BS of the MS, informing the BS to perform the logout operation upon the MS.

The anchor data path entity/FA, the ASN_GW, or the BS performs the MS logout operation according to the logout procedure in the active mode.

Embodiment Seven

Figure 6:
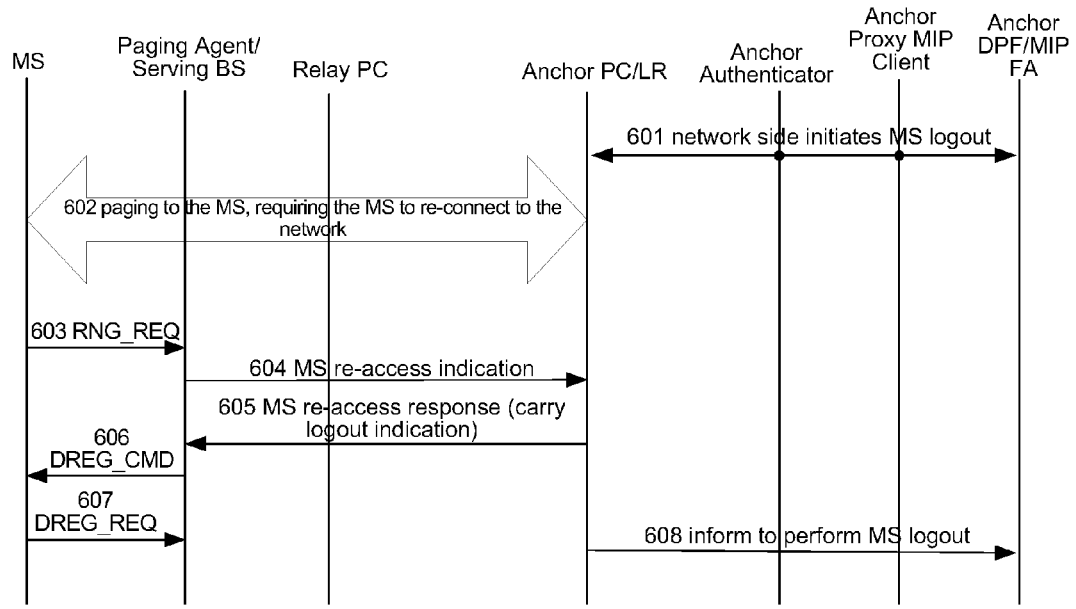
FIG. 6 is flowchart of a MS logout procedure according to a seventh embodiment of the invention.

The network side initiates a logout operation upon the MS. The anchor paging controller/location register initiates a paging procedure to the MS, requiring the MS to re-access the network from the idle mode. The network may then perform a logout procedure upon the MS during the MS re-accessing procedure. As illustrated in FIG. 6, the logout procedure includes following steps.

At 601, the network side entity triggers a logout operation and informs the anchor paging controller/location register to perform the logout operation upon the MS in the idle mode.

At 602, the anchor paging controller/location register initiates a paging procedure to the MS, requiring the MS to re-access the network.

At 603, the MS responds to a paging message and transmits a RNG_REQ message to the serving BS, and initiates a network re-access procedure.

At 604, the BS responds to the MS re-access and sends a message to inform the anchor paging controller/location register of the MS re-access procedure.

At 605, the anchor paging controller/location register makes a reply of a message to the BS. The message carries an indication requiring the MS to logout of the network.

At 606, after the BS received the indication, it sends a de-registration_command (DREG_CMD) message to request the MS to logout of the network.

At 607, the MS responds to the logout message, deletes the associated context it saved and makes a reply of a de-registration_request (DREG_REQ) message to the BS, indicating that the logout is completed.

At 608, the anchor paging controller transmits a message to the anchor data path (DPF) function entity/FA, indicating the anchor data path function entity/FA to perform a logout operation upon the MS. The DPF/FA performs logout operation upon the MS according to the deletion and release of the MS related context by the network side with regard to the idle mode.

In the foregoing embodiments, the relay paging controller forwards messages between the serving base station and the anchor paging controller/location register. In the scenario where there is no relay paging controller node to pass through, the serving base station might also send messages directly to the anchor paging controller/location register via serving ASN_GW.

Overall, the methods for network logout for the MS in the idle mode provide location update procedures for MS in the idle mode in various situations so that the location update procedure regarding the network side can be accomplished. The method further enables the paging controller or other network entities to delete the context of the MS and timely release resources that the network side configures for the MS after location update, and thus conserving the system resources.

The method according to the present disclosure includes, but not limited to, applications to the WiMAX system. It might also be applicable to other wireless access networks, for example, mobile network system evolved from 802.20, 3GPP (3rd Generation Partnership Project) LTE (Long Term Evolution), 3GPP2 (3rd Generation Partnership Project 2) AIE (Air Interface Evolution), etc.

The foregoing embodiments are provided merely as illustrations, rather than limitations to the present invention. Any modification, equivalents, improvements, etc., made within the spirit and principle of the present invention shall be construed as within the scope of protection of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for network side equipment to logout a mobile station in an idle mode, wherein the network side equipment comprises a plurality of network entities, the method comprising:
    receiving, by a paging agent of the plurality of network entities, a ranging request message carrying a power-off indication from the mobile station;
    verifying, by the paging agent, the ranging request message according to an authentication key and an authentication key context of the mobile station;
    after successfully verifying the ranging request message, sending a location update confirm message from the paging agent to an anchor paging controller/location register of the plurality of network entities;
    according to the location update confirm message sending a first message indicating the mobile station is power-off from the anchor paging controller/location register to an anchor data path function entity/foreign agent function entity of the plurality of network entities;
    according to the first message indicating the mobile station is power-off, initiating, by the anchor data path function entity/foreign agent function entity, a mobile IP address de-registration operation upon the mobile station, deleting a context of the mobile station stored in the anchor data path function entity/foreign agent function entity and sending a second message in response to the first message to the anchor paging controller/location register; and
    according to the second message, deleting, by the anchor paging controller/location register a context of the mobile station stored in the anchor paging controller/location register.

2. The method of claim 1, wherein the plurality of network entities comprises an anchor authenticator, and the method further comprises:
    after receiving the first message indicating the mobile station is power-off, sending, by the anchor data path function entity/foreign agent function entity, an instruction to the anchor authenticator for deleting a context of the mobile station stored in the anchor authenticator.

3. The method of claim 2, wherein the plurality of network entities comprise an Authentication Authorization Accounting (AAA) server, and the method further comprises:
    after receiving the instruction, triggering, by the anchor authenticator, an anchor accounting client to send an accounting termination message to the AAA server; and
    deleting, by the AAA server, a context of the mobile station stored in the AAA server.

4. The method of claim 1, wherein the ranging request message is sent by the mobile station when the mobile station powers off.

5. The method of claim 1, wherein before the paging agent verifying the ranging request message, the method further comprises:
    sending, by the paging agent, a key request message to an anchor authenticator of the plurality of network entities according to an identification of the anchor authenticator; and
    receiving, by the paging agent, the authentication key and the authentication key context of the mobile station generated according to the key request message, from the anchor authenticator.

6. The method of claim 1, wherein before the paging agent verifying the ranging request message, the method further comprises:
    sending, by the paging agent, a request for security information to the anchor paging controller/location register;
    receiving, by the paging agent, an identification of an anchor authenticator of the plurality of network entities from the anchor paging controller/location register, wherein the identification of the anchor authenticator is obtained by the anchor paging controller/location register according to the request for security information;
    sending, by the paging agent, a key request message to the anchor authenticator according to the identification; and
    receiving, by the paging agent, the authentication key and the authentication key context of the mobile station generated according to the key request message, from the anchor authenticator.

7. The method of claim 1, wherein before the paging agent verifying the ranging request message, the method further comprises:
    sending, by the paging agent, an request for security information to the anchor paging controller/location register;
    informing according to the request for security information, by the anchor paging controller/location register, an anchor authenticator of the plurality of network entities to generate an authentication key and an authentication key context of the mobile station; and sending, by the anchor paging controller/location register, the authentication key and the authentication key context of the mobile station to the paging agent.

8. A system for network side equipment to logout a mobile station in an idle mode, comprising a plurality of network entities serving the mobile station,
- wherein the plurality of network entities include an paging agent, an anchor data path function entity/foreign agent function entity and an anchor paging controller/location register;
- wherein the paging agent is configured to receive a ranging request message carrying a power-off indication from the mobile station, to verify the ranging request message according to an authentication key and an authentication key context of the mobile station, and to send a location update confirm message to the anchor paging controller/location register after successfully verifying the request message;
- wherein the anchor paging controller/location register is configured to, according to the location update confirm message, send a first message indicating the mobile station is power-off, to the anchor data path function entity/foreign agent function entity;
- wherein the anchor data path function entity/foreign agent function entity is configured to, according to the first message indicating the mobile station is power-off, initiate a mobile IP address de-registration operation upon the mobile station, to delete a context of the mobile station stored in the anchor data path function entity/foreign agent function entity and to send a second message in response to the first message to the anchor paging controller/location register; and
- wherein the anchor paging controller/location register is further configured to, according to the second message, delete a context of the mobile station stored in the anchor paging controller/location register.

9. The system of claim 8, wherein the anchor data path function entity/foreign agent function entity is configured to send an instruction to an anchor authenticator for deleting a context of the mobile station stored in the anchor authenticator, after receiving the first message which indicates the mobile station is power-off.

10. The system of claim 9, wherein the system further comprises the anchor authenticator, and
- wherein the anchor authenticator is configured to trigger an anchor accounting client to send an accounting termination message to an Authentication Authorization Accounting (AAA) server of the plurality of network entities, after receiving the instruction, to enable the AAA server to delete a context of the mobile station stored in the AAA server.

11. The system of claim 8, wherein the system further comprises the mobile station, wherein the mobile station is configured to send the ranging request message carrying the power-off indication to the paging agent.

12. The system of claim 8,
- wherein the paging agent is further configured to send a request for security information to the anchor paging controller/location register before verifying the request message, receive an identification of an anchor authenticator of the plurality of network entities from the anchor paging controller/location register, send a key request message to the anchor authenticator according to the received identification and receive the authentication key and the authentication key context of the mobile station generated according to the key request message, and sent by the anchor authenticator; and
- wherein the identification of the anchor authenticator is obtained by the anchor paging controller/location register according to the request for security information.

13. The system of claim 8, wherein
- the paging agent is further configured to send a request for security information to the anchor paging controller/location register before verifying the request message; and
- the anchor paging controller/location register is further configured to inform according to the request for security information, an anchor authenticator of the plurality of network entities to generate an authentication key and an authentication key context of the mobile station, obtain and send the generated authentication key and the authentication key context of the mobile station to the paging agent.

* * * * *